United States Patent
Palmer et al.

(10) Patent No.: US 6,763,156 B2
(45) Date of Patent: Jul. 13, 2004

(54) FLEXIBLE OPTOELECTRONIC CIRCUIT AND ASSOCIATED METHOD

(75) Inventors: William Devereux Palmer, Durham, NC (US); Richard LaBennett, Morrisville, NC (US)

(73) Assignee: MCNC, Durham, NC (US)

( * ) Notice: Subject to any disclaimer, the term of this patent is extended or adjusted under 35 U.S.C. 154(b) by 157 days.

(21) Appl. No.: 10/170,714

(22) Filed: Jun. 12, 2002

(65) Prior Publication Data

US 2003/0231819 A1 Dec. 18, 2003

(51) Int. Cl.[7] .............................................. G02B 6/12
(52) U.S. Cl. ............................... 385/14; 385/2; 385/8; 385/45; 385/130
(58) Field of Search ....................... 385/2–14, 42–49, 385/129–132

(56) References Cited

U.S. PATENT DOCUMENTS

| | | | |
|---|---|---|---|
| 3,622,419 A | 11/1971 | London et al. | 385/120 X |
| 3,670,639 A | 6/1972 | Harnden, Jr. | 396/542 |
| 3,872,236 A | 3/1975 | Swengel, Sr. et al. | 385/16 X |
| 3,943,021 A | 3/1976 | Lindsey | 385/15 X |
| 4,732,446 A | 3/1988 | Gipson et al. | 385/24 |
| 4,758,063 A | 7/1988 | Konechny, Jr. | 385/14 |
| 5,071,223 A | 12/1991 | Gotoh et al. | 385/14 |
| 5,125,054 A * | 6/1992 | Ackley et al. | 385/49 |
| 5,179,601 A | 1/1993 | Gotoh et al. | 385/14 |
| 5,198,684 A | 3/1993 | Sudo | 385/35 X |
| 5,200,631 A | 4/1993 | Austin et al. | 385/14 X |
| 5,249,245 A | 9/1993 | Lebby et al. | 385/89 |
| 5,265,184 A | 11/1993 | Lebby et al. | 385/132 |
| 5,329,067 A | 7/1994 | Abe et al. | 385/135 X |
| 5,463,229 A | 10/1995 | Takase et al. | 257/59 |
| 5,742,480 A | 4/1998 | Sawada et al. | 385/89 X |
| 5,764,826 A | 6/1998 | Kuhara et al. | 385/24 |
| 5,963,689 A | 10/1999 | Hesselbom | 385/53 |
| 6,137,172 A | 10/2000 | Bäcklund et al. | 257/727 |
| 6,191,838 B1 | 2/2001 | Muramatsu | 349/149 |
| 6,215,585 B1 | 4/2001 | Yoshimura et al. | 385/14 X |
| 6,229,712 B1 | 5/2001 | Munoz-Bustamante et al. | 385/93 X |

FOREIGN PATENT DOCUMENTS

| | | |
|---|---|---|
| JP | 03270195 A | 12/1991 |
| JP | 06281831 A | 10/1994 |

* cited by examiner

*Primary Examiner*—Phan T.H. Palmer
(74) *Attorney, Agent, or Firm*—McDermott, Will & Emery

(57) ABSTRACT

A flexible optoelectronic circuit is assembled on and released from a substrate, and therefore independent of a substrate. The substrate includes semiconductor substrates having a release layer. The release layer is etched to release the optoelectronic circuit such that the resulting circuit is flexible. Both optical elements, such as waveguides, and conductive elements are formed in layers, generally between insulating layers. The elements may be formed and patterned using standard semiconductor manufacturing techniques.

77 Claims, 7 Drawing Sheets

FLEXIBLE OPTOELECTRONIC CIRCUIT AND ASSOCIATED METHOD

FIELD OF THE INVENTION

The present invention relates to flexible optoelectronic circuits, and, more particularly, to flexible optoelectronic circuits monolithically formed on a substrate and subsequently released from the substrate.

BACKGROUND OF THE INVENTION

Flexible circuits, or three-dimensional circuits, have become more common as industrial and consumer electronics devices have become smaller and more portable. Flexible circuits are most commonly used in board-to-board, board-to-chip, and chip-to-chip connections in packages having limited space and stacked rigid boards, thus requiring three-dimensional connections. Some consumer applications include laptop computers, mobile phones, personal digital assistants, etc. Additionally, flexible circuits are increasingly used in mechanical devices requiring a mechanically dynamic circuit that permits motion, such as along robotic arms, fold areas, hinges, etc.

Flexible circuits began as a smaller alternative to ribbon cables and consisted of conducting elements providing interconnect of electronic assemblies. As the art progressed, circuit elements were fabricated from the electrical conductors. As optical componentry developed, manufacturers were pressed to add optical fibers to flexible circuits. These optical fibers could generally be arranged in special geometric orientations and mechanically manipulated to create passive optical circuit components as well, such as couplers, splitters, filters, etc.

Flexible circuits are generally formed from adhesively bonded laminates of dielectric. Dielectrics are laid out on a board and electrical conductors are plated using printed circuit board technology. Other flexible circuit fabrication techniques incorporate roll-to-roll processing.

Flexible circuits that incorporate optical and electrical components have become increasingly necessary, as the field of optoelectronics has spread into more and more applications. Generally, flexible circuits incorporating optical components are assembled with prefabricated optical fibers. These techniques require fabrication methods based on lamination of optical fibers between plies of flexible polyimide films. The flexible films add structural support so that the multiple fibers may be held in a curved or smoothly bent position, but do not enhance the performance of the fiber.

Increased use in progressive technology is primarily limited by size and density. Current technology of printed circuit board processing of flexible circuits provides that electronic and optical features are limited to features greater than about 250 $\mu$m, which make higher density applications difficult.

Therefore, a need exists for development of optoelectronic flexible circuits to be implemented in high density and high frequency application relating to three-dimensional packaging of industrial and consumer electronics devices. The desired flexible optoelectronic circuit should be able to be manufactured from existing manufacturing techniques to avoid additional equipment and industrial cost to effectively and efficiently manufacture flexible circuits.

BRIEF SUMMARY OF THE INVENTION

The present invention provides a multilayer flexible optoelectronic circuit that provides smaller density of optical elements within a flexible circuit. Additionally, an associated method for forming an optoelectronic circuit is provided.

A flexible optoelectronic circuit according to the present invention includes a first flexible insulating layer and an optical element deposited on a portion of the first insulating layer. Multiple optical elements may be provided. A second flexible insulating layer is deposited over the first insulating layer and optical element. The flexible optoelectronic circuit is formed on and subsequently released from a substrate and, therefore, independent of a substrate.

Additional embodiments of the flexible optoelectronic circuit include electrically conducting elements deposited within the circuit. For example, an electrical contact deposited within the first insulating layer is provided. A conductive layer is also provided and is deposited on the first flexible insulating layer and in electrical connectivity with the electrical contact. Additional embodiments include multiple conductive layers, separated by insulating layers. Similarly, multiple optical elements in additional layers including optical elements are also provided.

In one advantageous embodiment, the optical element deposited on a portion of an insulating layer comprises a first material and the first and second insulating layers comprise a second material. The first material has a higher refractive index than the second material thus permitting internal optical reflection and providing a waveguide. In one such embodiment, the optical element is integrally formed between first and second insulating layers by depositing compatible first and second materials in order to define the relationship of refractive indices thereto. Some such materials for accomplishing this include transparent organic materials comprising the first material, and photoimagable organic material comprising the second material. Examples of these organic materials include many polymers including polyimides, benzoncyclobutene, and polyfluorinatedcyclobutene.

Another advantageous embodiment of a flexible optoelectronic circuit includes a first flexible insulating layer and a second flexible insulating layer deposited on the first insulating layer. Defined on the second insulating is an optical element pattern. An optical element, as described above, is deposited within the optical pattern. Additional optical element patterns and optical elements are also provided according to some embodiments of the invention. A third flexible insulating layer deposited on the second insulating layer and the optical element. As such, the optoelectronic circuit is independent of a substrate, as described in the above embodiments. Conductive elements deposited between the insulating layers and, if desired, additional insulating layers are provide in other embodiments and constructed of materials as described above. Several embodiments include additional layers of optical elements deposited within additional insulating layers.

Another advantageous embodiment of an optoelectronic circuit includes a substrate and a release layer deposited on the substrate upon which flexible insulating layers, including optical elements, are formed. According to this embodiment, a first flexible insulating layer deposited on the release layer and an optical element is deposited on a portion of the first insulating layer. A second flexible insulating layer is deposited on the first insulating layer and the optical element. As such, the first and second insulating layers comprise a flexible optoelectronic circuit when separated from the substrate and release layer.

According to one embodiment of the optoelectronic circuit the substrate is a semiconductor material. It is advantageous for the release layer to comprise an oxide layer formed on the semiconductor material. As such, the oxide layer permits the flexible optoelectronic circuit to be removed from the substrate using standard etching techniques.

Alternatively, the release layer may comprise an ultraviolet sensitive adhesive, which permits exposing to ultraviolet light to release to adhesive from the substrate. An additional embodiment of a flexible optoelectronic circuit according to the present invention comprises a first flexible insulating layer including an electrical contact deposited within. The electrical contact is in electrical connectivity with a first conductive layer deposited on the first insulating layer. A second flexible insulating layer is deposited on the first insulating layer and includes at least one optical element pattern defined therein. An optical element deposited within the optical pattern of the second insulating layer. A third flexible insulating layer is deposited on the second insulating layer and the optical element. As such, the optical element is formed of a material having an index of refraction higher than the indices of refraction of the material forming the flexible insulating layers. Also, according to this embodiment of the flexible optoelectronic circuit, the optoelectronic circuit is formed on and subsequently released from a substrate and, therefore, independent of a substrate.

Another aspect of the present invention includes a method of forming a flexible optoelectronic circuit. One embodiment of the method comprises depositing a release layer on a substrate, depositing a first and second flexible insulating layer first on the substrate. The method includes defining at least one optical element pattern in the second flexible layer, to permit depositing an optical element within the optical element pattern. Additionally, the method includes depositing a third flexible insulating layer on the second flexible insulating layer and the optical element. Upon completing the construction foregoing construction steps the release layer is released from the first flexible insulating layer in order to remove the substrate from the flexible optoelectronic circuit. The resultant product is a flexible optoelectronic circuit.

In one embodiment of the method for forming an optoelectronic circuit, the step of depositing a release layer comprises depositing an oxide layer on a semiconductor substrate. Alternatively, the step of depositing an oxide layer may comprise growing an oxide layer on the semiconductor substrate. One embodiment of releasing the release layer may then comprise etching the oxide layer from the substrate.

Other embodiments of the method of forming a flexible optoelectronic circuit include applying common monolithic manufacturing methods. For example, on embodiment includes depositing the first, second, and third insulating layers comprises depositing via spin-on deposition. Other methods include depositing insulating layers comprising photoimagable organic material and imaging the photoimagable organic material in order to define optical patterns in an insulating layer. Additionally, depositing transparent organic material in the defined optical patterns is also provided according to one embodiment of the method. As such, depositing the transparent organic material includes depositing a material with a higher index of refraction the material deposited to form the insulating layers. Some types of material comprising the photoimagable organic material and transparent organic material include polyimides, benzocyclobutene, and polyfluorinatedcyclobutene.

One advantageous embodiment of the method for forming a flexible optoelectronic circuit additionally comprises depositing a conductive layer on at least one of the described insulating layers. These embodiments may include depositing electrical contacts within the first insulating layer, wherein the electrical contacts are in electrical connectivity with the conductive layer.

Yet another embodiment of forming a flexible optoelectronic circuit is provided. This embodiment comprises depositing a release layer on a substrate, and subsequently depositing first and second flexible insulating layers on the substrate and release layer. An optical element is deposited on a portion of the first flexible insulating layer between the first and second insulating layers. Upon completing the construct of the flexible circuit, the method includes releasing the release layer so as to remove the release layer and the substrate. Thus a flexible optoelectronic circuit is provided from the method. The present invention also includes the optical electronic circuit provided by the method described herein.

BRIEF DESCRIPTION OF THE SEVERAL VIEWS OF THE DRAWINGS

Figure 1A:
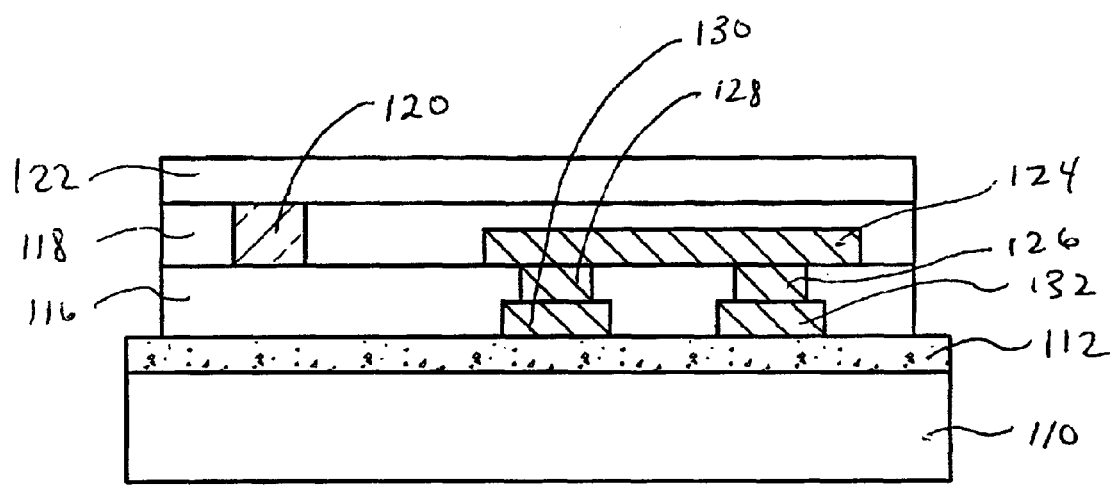
Figure 1B:
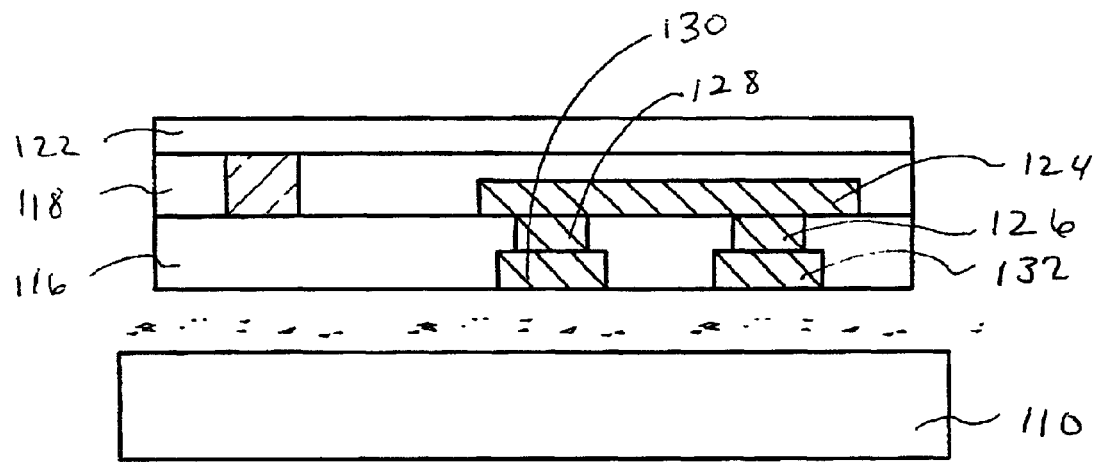
Figure 2A:
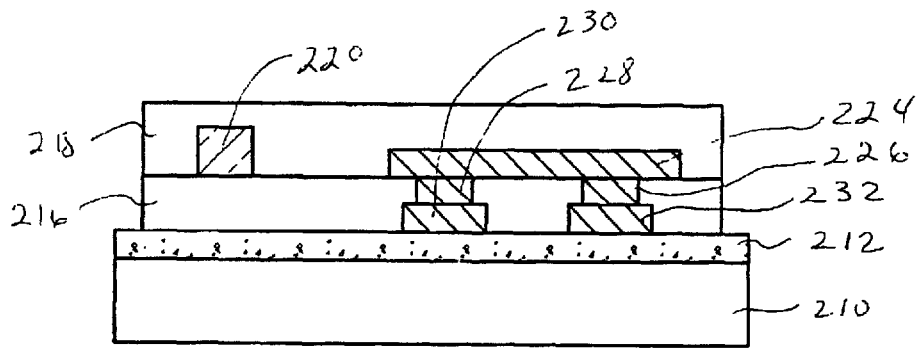
Figure 2B:
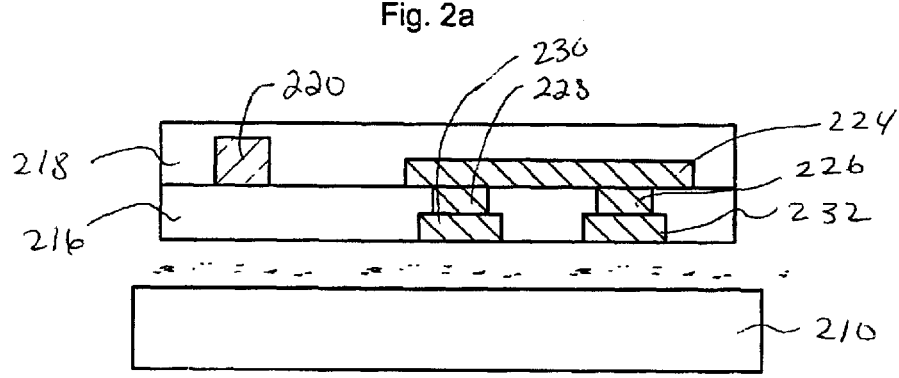
Figure 3:
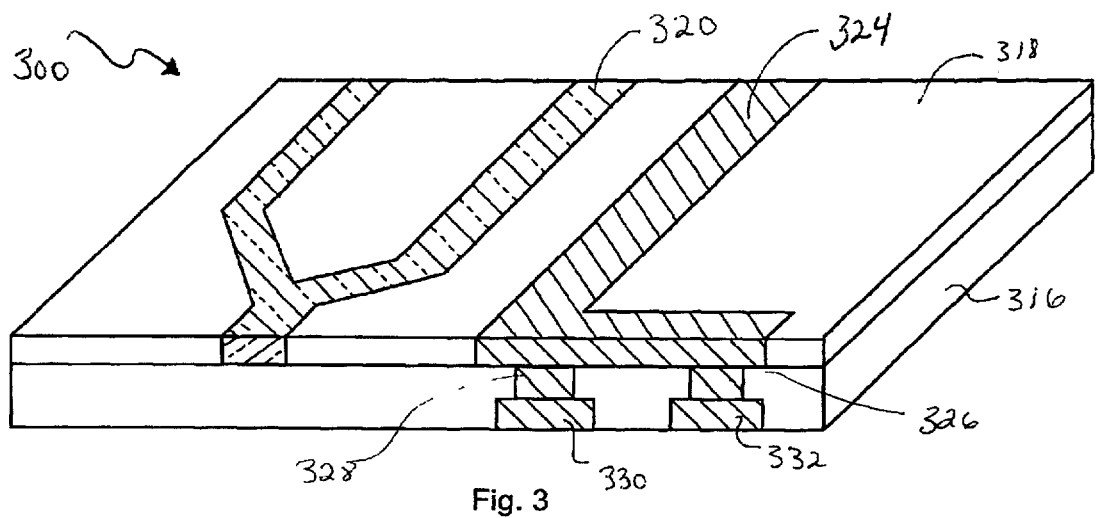

Having thus described the invention in general terms, reference will now be made to the accompanying drawings, which are not necessarily drawn to scale, and wherein:

FIGS. 1(a)–(b) are cross section elevation views of a flexible optoelectronic circuit deposited on a substrate and independent of a substrate according to one embodiment of the present invention;

FIGS. 2(a)–(b) are cross section elevation views of a flexible optoelectronic circuit deposited on a substrate and independent of a substrate according to another embodiment of the present invention;

FIG. 3 is an orthographic cross section view illustrating simplified optical and conductive arrangements on a flexible optoelectronic circuit according to one embodiment of the present invention;

FIGS. 4(a)–(h) are cross section elevation views of a flexible optoelectronic circuit being formed on and released from a substrate according to one embodiment of the present invention; and FIGS. 5(a)–(f) are cross section elevation views of a flexible optoelectronic circuit being formed on and released from a substrate according to one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to one embodiment of the present invention as depicted in FIG. 1(a), a flexible optoelectronic circuit 100 is deposited on a substrate 110 by way of a release layer 112. The release layer 112 permits releasing the circuit 100 from the substrate 110. It will be understood by those having ordinary skill in the art that when a layer or element is "deposited on" another layer or element, it may be formed directly on top, bottom or side surface area, or one or more intervening layers may be provided between the layers.

The optoelectronic circuit 100 comprises a first insulating layer 116, a second insulating layer 118 including an optical element 120 formed therein, and a third insulating layer 122 deposited on the optical element 120 and second insulating layer 118. In this embodiment, insulating layers 116, 118, 122 comprise one or more organic dielectric materials, selected for their compatibility to manufacturing processes and for their optical properties, discussed in more detail below. The optoelectronic circuit 100 is deposited upon a substrate 110 by way of the release layer 112. According to one embodiment, the substrate 110 comprises a semiconductor and the release layer 112 comprises a semiconductor oxide layer. Alternatively, the flexible optoelectronic circuit may be formed on an adequate surface, such as ceramic, quartz, or glass, and a corresponding release layer provided matching the material characteristics of the substrate and permitting fabrication and release.

FIG. 1(b) represents the flexible optoelectronic circuit 100 having been released from the substrate 110 and therefore independent of a substrate. The release layer has been removed from the first insulating layer 116 and the substrate 110. Methods and techniques for removing release layers commensurate with particular materials may be used, and one example is described more fully below. As the layers and components have been released from the substrate, a flexible optoelectronic circuit 100 independent of a substrate 110 is thereby provided.

As is also depicted in FIGS. 1(a) and 1(b), one embodiment of the flexible optoelectronic circuit 100 includes at least one conductive layer 124 deposited on an insulating layer 116. The conductive layer 124 is typically formed of conductive materials generally used in flexible circuits, preferably metal, such as copper, platinum, gold, aluminum, etc. As is known to one of ordinary skill in the art, the conductive layer 124 may be employed in electronic circuits and electronic elements within the flexible circuit 100. Accordingly, the conductive layer 124 is selected according to desired electronic circuit elements and components requirements.

Typically, it is desirable to provide a conductive layer 124 in communication with back contacts 130, 132 on the flexible circuit 100 formed within the first insulating layer 116. As such, these contacts 130, 132 are in electrical connectivity with conducting elements deposited on the first insulating layer 116 of the optoelectronic circuit 100. In the one embodiment shown in FIGS. 1(a) and 1(b), electrical connectivity between the contacts 130, 132 and the conductive elements are achieved by depositing electrical vias 126, 128 within the first insulating layer 116. In this embodiment, conductive patterns within the first insulating layer 116, and any similarly desired patterns within the second or third insulating layers 118, 122 are deposited according to desired via routing and generally deposited according to the specific application requirements of the flexible circuit.

In one advantageous embodiment, the flexible insulating layers 116, 118, 122 comprise dielectric organic material deposited in layers. The organic materials used in this embodiment are chosen according to a relatively lower refractive index in comparison to the optical elements 120, discussed in more detail below. Some specific materials that are used in this embodiment include organic materials from the families of benzocyclobutenes (BCB), polyimides, or polyfluorinatedcyclobutenes and other aryl ether polymers containing perfluorocyclobutyl linkages, hereinafter referred to as PFCB.

The one or more optical elements 120, generally waveguides, are also typically organic materials and include materials from the families of BCBs, polyimides, or PFCBs. As such, the optical element material is selected according to its index of refraction in relationship to the indices of refraction of the material forming the insulating layers 116. When the index of refraction of the optical element 120 is higher than that of the insulating layers 116, 118, 122, an optical ray propagating through the optical element 120 will be internally reflected when at an angle of incidence greater than the critical angle determined by the respective indices of refraction, thereby forming a waveguide. For example, a transparent material may be chosen to form the waveguide. The insulating layers 116, 118, 122, which are deposited on the optical elements 120, are chosen to have correspondingly lower indices of refraction in order to act as a cladding for the waveguide.

Additionally, the insulating layers and optical elements may include photoimagable organic material, selected from the above groups, which permits imaging. Such materials may be used, as required, in order to define additional structures, optical and electrical, deposited on layers of the flexible optoelectronic circuit. Typically, these structures are defined by monolithic fabrication techniques, such as photolithography. As such, the resulting elements generally have a feature size of about 5 $\mu$m to about 50 $\mu$m. Therefore, the feature size of the elements permits a higher density optoelectronic circuit (i.e., a greater number of elements deposited within a single layer), and provides for multiple layers, while maintaining desired physical properties, such as flexibility, size, etc.

FIGS. 2(a) and 2(b) illustrate a cross sectional view of such an alternate embodiment of the flexible optoelectronic circuit 200, also deposited on and independent of a substrate 210. In this embodiment, an optical element 220 is deposited on the first insulating layer 216 independently of the second insulating layer 216. The second insulating layer 218 is deposited on the optical element encompassing the portion not contacting the first insulating layer 216. Therefore, the requirement of an additional insulating layer is obviated. An advantageous material for the insulating layers 216, 218 in this embodiment also includes photoimagable BCBs, polyimides, and PFCBs. The optical material is selected such that the corresponding index of refraction is higher than that of the index of refraction of the insulating layers 216.

FIGS. 2(a) and 2(b) also depict a conductive layer 224, back contacts 230, 232, and electrical vias 226, 228. The conductive layer 224 is typically formed of conductive materials generally used in flexible circuits, as in the previously described embodiment. Similarly, the conductive layer 224 may be employed in electronic circuits and electronic elements within the flexible circuit 200. Accordingly, the conductive layer 224 is selected according to desired electronic circuit elements and components requirements.

The optoelectronic circuit 200 is deposited upon a substrate 210 having a release layer 212. The release layer 212 permits releasing the circuit 200 from the substrate 210. According to one embodiment, the substrate and release layer comprise a semiconductor and semiconductor oxide layer, respectively. In FIG. 2(b) the flexible optoelectronic circuit 200 has been released from the substrate 210 and is therefore independent of a substrate. According to another embodiment, the substrate and release layer comprise a ultraviolet light transparent substrate, such as glass or quartz, and an ultraviolet light sensitive adhesive. The release layer has been removed from the first insulating layer 216 and the substrate 210. Methods and techniques for removing release layers commensurate with particular materials are used, and one example is described more fully below. As the layers and components have been released from a substrate, a flexible optoelectronic circuit independent of a substrate is thereby provided.

Desired circuit elements, including electronic, optical, and optoelectronic elements may be deposited with the flexible optoelectronic circuits of the present invention. The optical elements typically comprise waveguides. As is known to those skilled in the art, waveguides are therefore deposited in spatial relationships with other waveguides and/or other devices to form passive or active optoelectronic elements, such as directional couplers, Y-splitters, diffraction gratings, optical filters, Bragg gratings, modulators, etc. Therefore, optical patterns and conductor patterns defined on insulating layers throughout the flexible optoelectronic circuit are specifically designed to obtain certain desired elements.

For example, FIG. 3 illustrates an orthographic cross section view of an optoelectronic circuit 300 having a waveguide and a conductive layer 324. In this regard, FIG. 3 is a relatively simplistic layout for illustration purposes. The optical pattern defines a Y-splitter 320, in which the optical material forms a waveguide and permits splitting an optical signal to two separate paths. As such, the optical pattern for a splitter 320 is necessarily defined within the second insulating layer 316. Additionally, simple electronic interconnection circuit is also depicted. A microstrip line 320 is provided comprising a conductive layer. The microstrip 324 is in communication with each of the back contacts 330, 332 by way of the vias 326, 328.

Similarly, FIGS. 1 through 3 are examples of relatively simplistic configurations and related optic and electrical connectivities. It should be noted that other fabrication configurations and electrical connectives are also feasible and are within the inventive concepts disclosed herein. The specific configuration and connectivity will be chosen to best match the performance requirements of a particular application. The flexible optoelectronic circuit of the present invention is generally fabricated using standard semiconductor manufacturing techniques. The flexible optoelectronic circuit is deposited on a substrate by way of a release layer and subsequently released from the substrate, thus the flexible circuit is independent of a substrate.

Having described embodiments of the flexible optoelectronic circuit, it is appropriate to now turn to an advantageous method for forming the flexible optoelectronic circuit. Therefore, as described herein, the manufacturing of the flexible optoelectronic circuit is demonstrated by example with respect to standard monolithic semiconductor manufacturing techniques, including chemical vapor phase deposition (CVD) techniques, physical vapor deposition or sputtering techniques, metal evaporation techniques, metal plating techniques (electroplating and electroless plating), spin-on deposition techniques, photolithography, and wet or dry etching techniques. The specific deposition technique is often chosen with respect to manufacturing equipment and materials used in the deposition. As such, the inventive principles discussed herein may be used in conjunction with many techniques and materials, as will be recognized by one of ordinary skill in the art. Some specific materials compatible with these techniques have been identified and include materials related to the families of semiconductors, semiconductor oxides, BCBs, polyimides, PFCBs, conductive films, and resistive films.

FIGS. 4(a) through 4(h) illustrate one advantageous method of forming a flexible optoelectronic circuit. Starting with FIG. 4(a), the flexible optoelectronic circuit is formed on a substrate 410 having a release layer 412. Typically, the substrate 410 comprises a semiconductor material. The release layer is generally an oxide layer on the semiconductor material. An oxide layer may be grown by methods of wet or dry oxide reaction with the semiconductor substrate. Alternatively, an oxide layer may be deposited via CVD techniques. An oxide release layer is particularly well suited for providing a release layer due to the availability of commercially accepted etching methods for removing the release layer. Alternative substrates and release layers particularly suited to etching techniques will also be recognized by one of ordinary skill in the art and can be substituted accordingly.

Figure 4A:
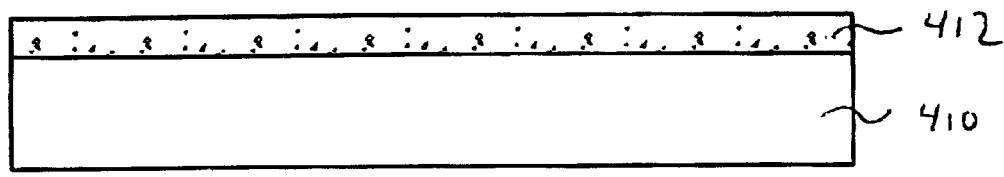
Figure 4B:
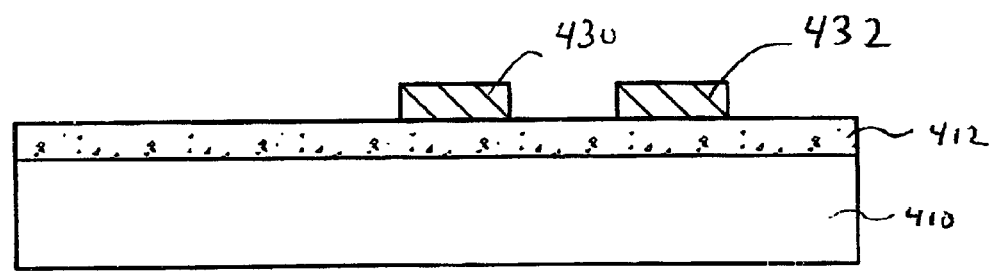

As shown in FIG. 4(b), deposited on the release layer 412 are back contacts 430, 432 for the flexible optoelectronic circuit. Typically, it is desirable to provide back contacts 430, 432 on the flexible circuit formed within the first insulating layer 416. Therefore, the contacts 430, 432 are typically conductive thin films deposited and patterned by standard monolithic deposition and etching techniques. Such techniques are known to one of ordinary skill in the art and include using one or more photoresists, and a series of imaging, curing, and etching steps as is appropriate for the particular conductive material being used to form the contacts 430, 432.

The first insulating layer 416 is deposited on the release layer 412. The first insulating layer advantageously comprises a BCB, polyimide, or PFCB, and more advantageously a photoimagable BCB, polyimide, or PFCB. As such, these exemplary photoimagable organic materials permit image curing and etching specific optical and electrical patterns for use in depositing subsequent layers. In this regard, the first insulating layer 416 is also deposited using a common deposition technique, such as spin-on deposition, stencil, and screen print techniques, as are known to those skilled in the art.

Figure 4C:
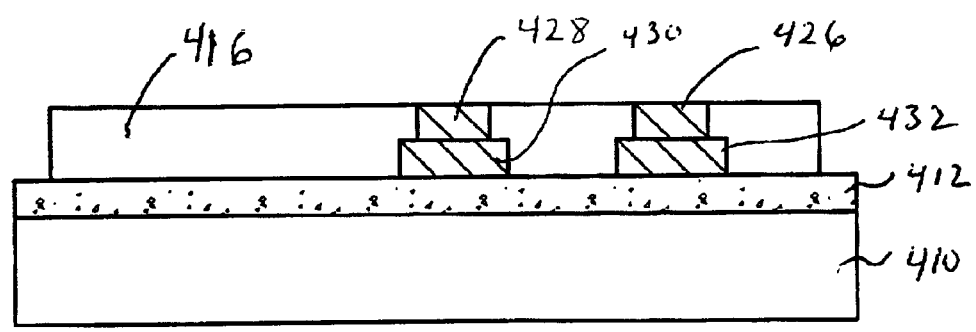

Generally, the contacts 430, 432 are in electrical connectivity with conductive elements deposited on the first insulating layer 416 or subsequent insulating layers of the optoelectronic circuit. A conductive layer may be deposited directly on the contacts 430, 432 or, as is more often the case, deposited in electrical connectivity through electrical vias. FIG. 4(c) illustrates vias 426, 428 deposited through the first insulating layer 416. Again, one or more photoresists are deposited imaged, cured, and etched as is appropriate for the particular insulating layer material and the conductive material deposited for the vias 426, 428.

Figure 4D:
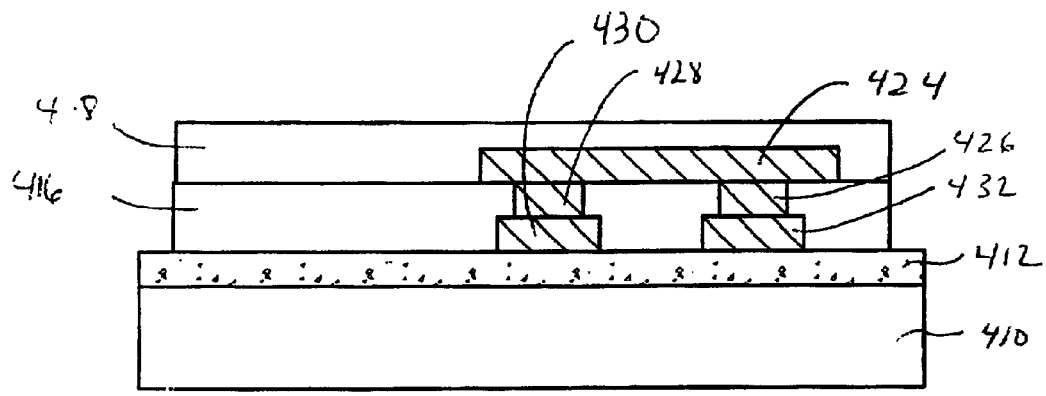

Subsequently, FIG. 4(d) illustrates a conductive layer 424 deposited on the vias and first insulating layer 416 and patterned as desired using same monolithic manufacturing techniques. The conductive layer 424 material is selected according to the desired electronic elements and components that may be incorporated into the flexible optoelectronic circuit. These may include films that are commonly used in flexible circuit electronic elements and components, such as conductive thin films and resistive thin films.

FIG. 4(d) also depicts a second insulating layer 418 deposited on the conductive layer 424 and the first insulating layer 416. In this example, the second insulating layer 418 is a photoimagable organic material, such as a photoimagable BCB or polyimide. As such, the techniques used to deposit the second insulating layer 418 are substantially the same as those used to deposit the first insulating layer 416.

Figure 4E:
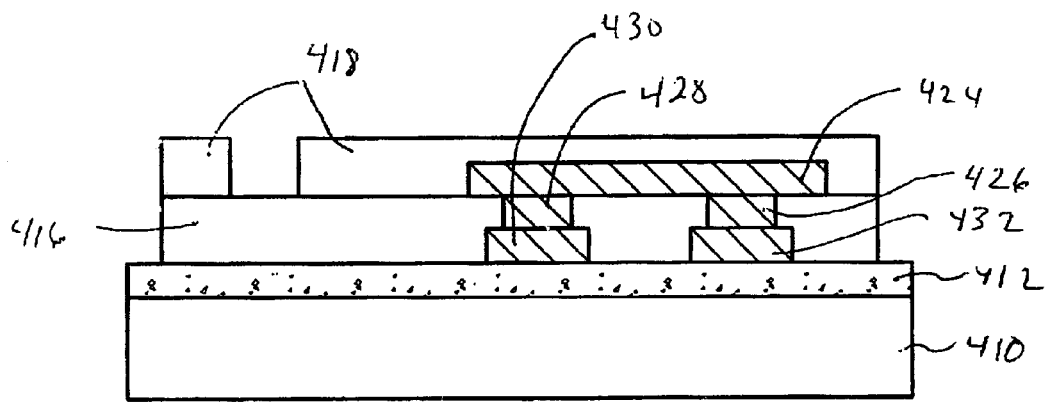

Referring now to FIG. 4(e), a pattern may be defined within the second insulating layer 418 by means of photolithography and etching. This is represented in FIG. 4(e) by the recess within the second insulating layer 418. In this regard, the patterns are etched in order to define optical patterns subsequently filled with an optical waveguiding material, discussed in more detail below.

Figure 4F:
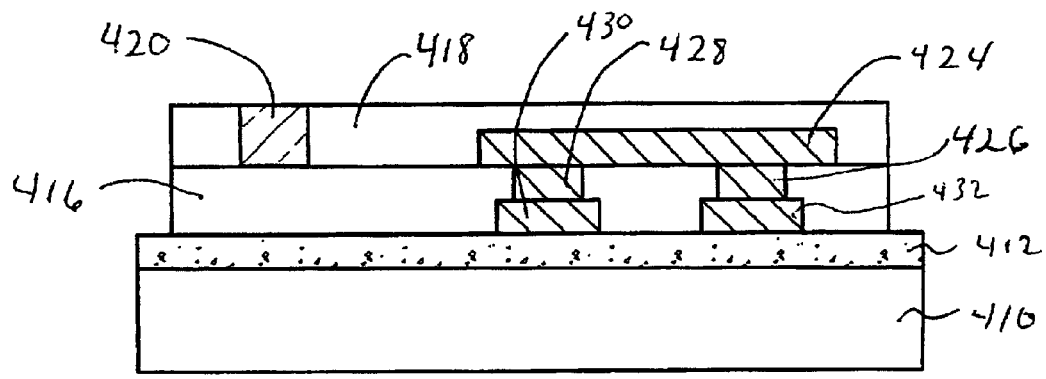

As illustrated in FIG. 4(f), optical material, typically a transparent organic material, such as BCB, polyimide, or PFCB, is then chosen to fill the optical pattern forming the optical element 420, a waveguide. As with previous layers of BCB, polyimide, or PFCB, similar deposition techniques compatible with the desired optical material may be used, as in the above steps. The specific material selected for the optical elements, however, must be carefully selected to ensure that the optical element 420 operates as a waveguide. The optical element material is selected according to its index of refraction in relationship to the indices of refraction of the material forming the insulating layers 416, 418, 422. When the index of refraction of the optical element 420 is higher than that of the insulating layers 416, 418, 422, an optical ray propagating through the optical element 420 will be internally reflected when at an angle of incidence greater than the critical angle determined by the respective indices of refraction, thereby forming a waveguide.

Figure 4G:
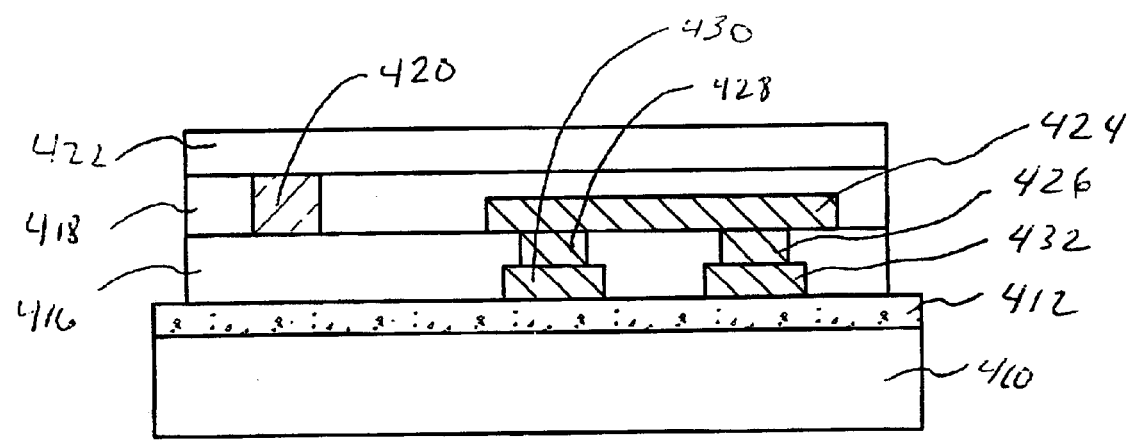

As depicted in FIG. 4(g), deposited on the optical element 420 and the second insulating layer 418 is a third insulating layer 422, which is also selected from the families of BCBs, polyimides, and PFCBs. As such, the third insulating layer 422 is deposited in substantially the same manner as the first and second insulating layer.

Subsequently, additional conductive layers and conductive elements, optical elements and insulating layers may be similarly deposited on the previously described layers. Additionally, the disclosure herein illustrates a relatively simple layer depicting minimal conductive elements and optical elements, however, it is expected that multiple optical and conductive elements will be deposited within a single layer, and multiple layers optical and conductive elements will be repeatedly designed and deposited upon other layers. The number of elements within a layer and the number of layers themselves are only constrained by the available manufacturing parameters, such as size requirements for the imaging and etching techniques, the area of the semiconductor substrate, and by the physical dimension limitations set for the circuit by the intended application of the circuit.

Figure 4H:
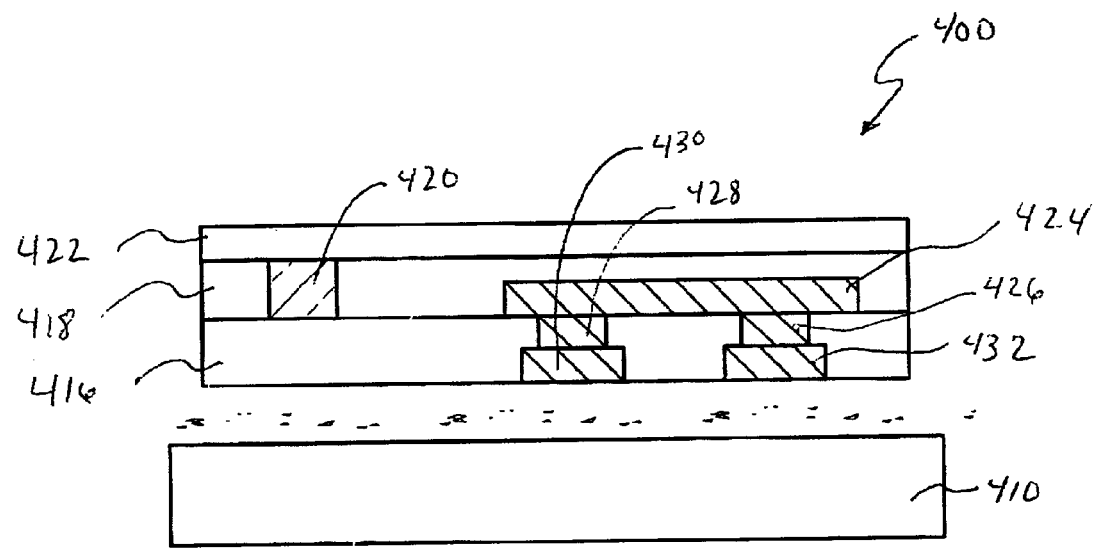
Figure 5A:
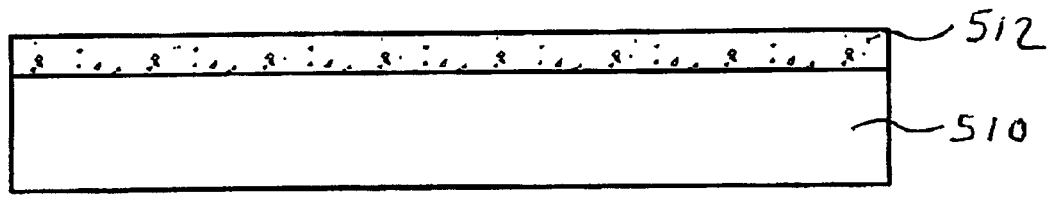
Figure 5B:
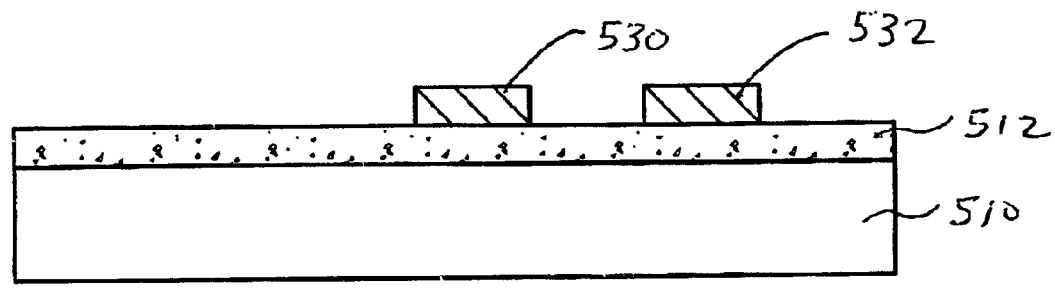
Figure 5C:
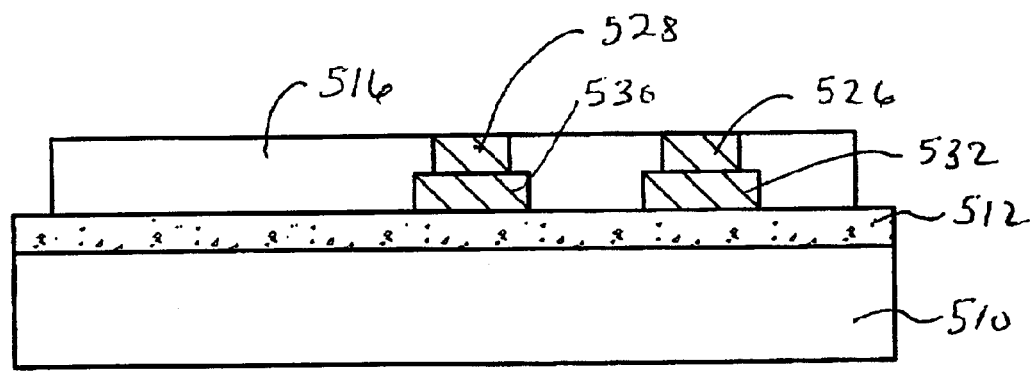
Figure 5D:
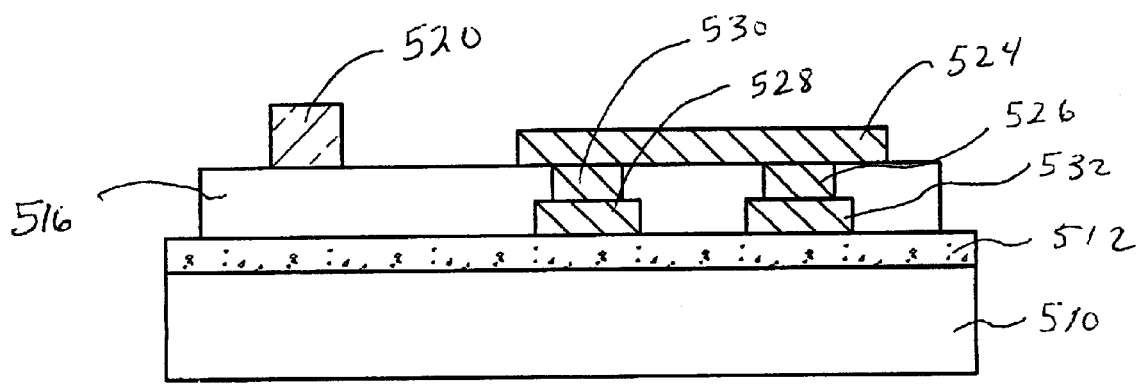
Figure 5E:
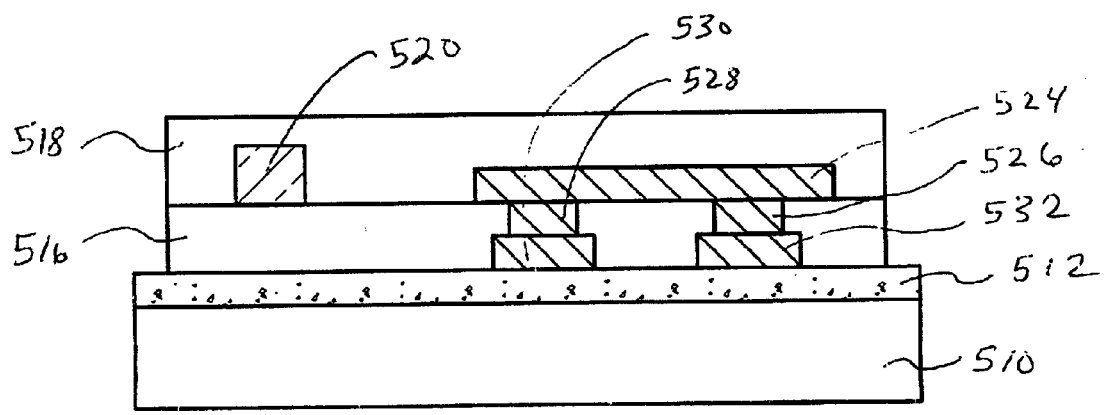
Figure 5F:
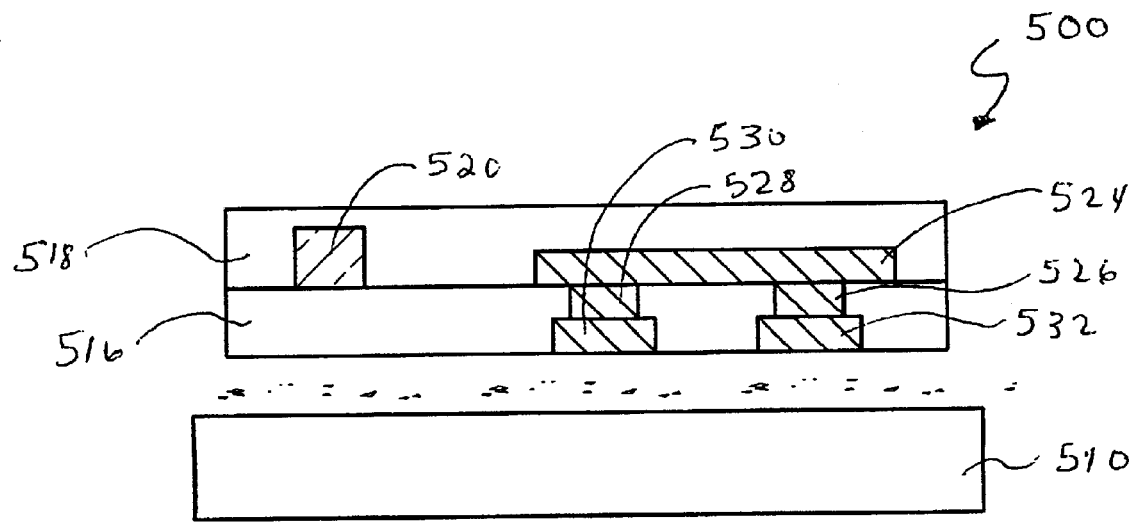

Referring to FIG. 4(h), upon completing formation of the optoelectronic circuit elements and layers, the layers and circuit elements are released from the substrate 410. One embodiment of releasing the circuit comprises etching the release layer 412, such as when the release layer is an oxide layer. Etching comprises any etching technique from the families of wet and dry etching techniques appropriate for etching compatible with the release layer and ease of manufacture. These etching techniques are known to one of ordinary skill in the art and will become apparent with respect to the selection of a desired material for the substrate and corresponding release layer. The resulting circuit is therefore a flexible optoelectronic circuit 400.

Another embodiment of releasing the optoelectronic circuit comprises exposing the release layer 412 to ultraviolet light, such as when the release layer is an ultraviolet sensitive adhesive. In this case, the release layer is formed on a substrate 410, which is transparent to ultraviolet light, such as glass or quartz. The flexible optoelectronic circuit 400 is formed on the adhesive release layer in accordance with the foregoing discussion. After forming the flexible optoelectronic circuit, the adhesive is exposed to ultraviolet light through the transparent substrate. Once the release layer is exposed to ultraviolet light, the adhesiveness is deactivated and the optoelectronic circuit 400 is released from and independent of the substrate.

It should be noted that while the embodiments described herein appears to provide for specific layering, i.e., constructing an insulating layer prior to a conductive layer or an insulating layer prior to an optical element, it is possible to process the layering of the device in any order that makes for efficient and reliable manufacturing. In other words, it is possible and within the inventive concepts herein disclosed to fabricate the device with either the conductive layers being deposited and patterned, and then insulating layers deposited thereon, or vice versa, or combinations of each.

For example, FIGS. 5(a) through 5(f) illustrate such an alternate method of forming an optical element independent of any pattering and etching of a recess in an insulating layer. In this embodiment, the release layer 512, the first insulating layer 516 back contacts 530, 532, and vias 526, 528, are all formed substantially similar to the steps described above, as shown in FIGS. 5(a) through 5(c). However, referring to FIG. 5(d), the optical element 520 is formed without respect to defining an image in the first insulating layer. Rather, the optical element 520 is deposited in a layer and subsequently imaged and etched to define the element deposited upon the first insulating layer. The second insulating 518 layer is likewise deposited over the conductive layer 524 and the optical element 520 forming an optoelectronic flexible circuit 500. Therefore, the need for a third insulating layer has been obviated.

As will be recognized by one of ordinary skill in the art, the steps described herein are of general reference to one or more steps and substeps required to achieve desired layering and circuit configurations, particularly with respect to photolithography, deposition of material, and etching. These additional steps vary depending on the specific methods selected to achieve the foregoing steps, however, one of ordinary skill in the art will recognize the required steps and substeps upon choosing the best techniques which are efficient and available for manufacturing the flexible optoelectronic circuit disclosed herein. Therefore, additional steps will generally be required with respect any one of these methods, and will be easily recognized by one of ordinary skill in the art.

These specific examples address advantageous embodiments of the present invention. In this regard, FIGS. 4 and 5 are examples of relatively simplistic configurations and related optic and electrical connectivities for illustration purposes. It is expected that more complex electrical and optical connectivities and elements will be desired when implementing the concepts of this invention, and these complex structures are known and will become apparent to one of ordinary skill in the art. Although not specifically addressed herein, other fabrication techniques such as inkjet deposition, screen printing, and roll-to-roll processing may also be implemented in accordance with the present invention with compatible materials without departing from the scope or spirit of the present invention.

Many modifications and other embodiments of the invention will come to mind to one of ordinary skill in the art to which this invention pertains having the benefit of the teachings presented in the foregoing descriptions and the associated drawings. Therefore, it is to be understood that the invention is not to be limited to the specific embodiments disclosed and that modifications and other embodiments are That which is claimed:

1. A flexible optoelectronic circuit, comprising:
   a first flexible insulating layer;
   at least one optical element deposited on a portion of the first insulating layer; and
   a second flexible insulating layer deposited on the first insulating layer and the at least one optical element, wherein the optoelectronic circuit is independent of a substrate.

2. The flexible optoelectronic circuit according to claim 1, wherein the at least one optical element comprises a first material and the first and second insulating layers comprise a second material, the first material having a higher refractive index than the second material.

3. The flexible optoelectronic circuit according to claim 2, wherein the first material comprises a transparent organic material.

4. The flexible optoelectronic circuit according to claim 3, wherein the transparent organic material is selected from the group consisting of polyimides, benzocyclobutene, polyfluorinatedcyclobutene, and aryl ether polymers containing perfluorocyclobutyl linkages.

5. The flexible optoelectronic circuit according to claim 2, wherein the second material comprises a photoimagable organic material.

6. The flexible optoelectronic circuit according to claim 5, wherein the photoimagable organic material is selected from the group consisting of polyimides, benzocyclobutene, polyfluorinatedcyclobutene, and aryl ether polymers containing perfluorocyclobutyl linkages.

7. The flexible optoelectronic circuit according to claim 2, wherein the at least one optical element is integrally formed between first and second insulating layers.

8. The flexible optoelectronic circuit according to claim 1, further comprising at least one electrical contact deposited within the first insulating layer.

9. The flexible an optoelectronic according to claim 8, further comprising a first conductive layer deposited on the first flexible insulating layer and in electrical connectivity with the at least one electrical contact.

10. The flexible optoelectronic circuit according to claim 9, further comprising a second conductive layer deposited on the second flexible insulating layer and in electrical connectivity with the first conductive layer.

11. The flexible optoelectronic circuit according to claim 1, further comprising:
    at least one optical element deposited on a portion of the second insulating layer; and
    a third insulating layer deposited on the second insulating layer and the at least one optical element deposited on the second insulating layer.

12. A flexible optoelectronic circuit, comprising:
    a first flexible insulating layer;
    a second flexible insulating layer deposited on the first insulating layer, the second insulating layer having at least one optical element pattern defined therein;
    at least one optical element deposited within the at least one optical pattern of the second insulating layer; and
    a third flexible insulating layer deposited on the second insulating layer and the at least one optical element, wherein the optoelectronic circuit is independent of a substrate.

13. The flexible optoelectronic circuit according to claim 12, wherein the at least one optical element comprises a first material and the first, second, and third insulating layers comprise a second material, the first material having a higher refractive index than the second material.

14. The flexible optoelectronic circuit according to claim 13, wherein the first material comprises a transparent organic material.

15. The flexible optoelectronic circuit according to claim 14, wherein the transparent organic material is selected from the group consisting of polyimides, benzocyclobutene, polyfluorinatedcyclobutene, and aryl ether polymers containing perfluorocyclobutyl linkages.

16. The flexible optoelectronic circuit according to claim 13, wherein the second material comprises a photoimagable organic material.

17. The flexible optoelectronic circuit according to claim 16, wherein the photoimagable organic material is selected from the group consisting of polyimides, benzocyclobutene, polyfluorinatedcyclobutene, and aryl ether polymers containing perfluorocyclobutyl linkages.

18. The flexible optoelectronic circuit according to claim 13, wherein the at least one optical element is integrally formed between first and second insulating layers.

19. The flexible optoelectronic circuit according to claim 12, further comprising at least one electrical contact deposited within the first insulating layer.

20. The flexible optoelectronic circuit according to claim 19, further comprising a first conductive layer deposited on the first flexible insulating layer and in electrical connectivity with the at least one electrical contact.

21. The flexible optoelectronic circuit according to claim 20, further comprising a second conductive layer deposited on the second flexible insulating layer and in electrical connectivity with the first conductive layer.

22. The flexible optoelectronic circuit according to claim 12, further comprising:
    a fourth insulating layer deposited on the third insulating layer, the fourth insulating layer having at least one optical pattern defined therein;
    at least one optical element deposited within the at least one optical element pattern of the fourth insulating layer; and
    a fifth insulating layer deposited on the fourth insulating layer and the at least one optical element deposited within the fourth insulating layer.

23. An optoelectronic circuit, comprising:
    a substrate;
    a release layer deposited on the substrate;
    a first flexible insulating layer deposited on the release layer;
    at least one optical element deposited on a portion of the first insulating layer; and
    a second flexible insulating layer deposited on the first insulating layer and the at least one optical element, wherein the first and second insulating layers comprise a flexible optoelectronic circuit when separated from the substrate and release layer.

24. The optoelectronic circuit according to claim 23, wherein the at least one optical element comprises a first material and the first and second insulating layers comprise a second material, the first material having a higher refractive index than the second material.

25. The optoelectronic circuit according to claim 24, wherein the first material comprises a transparent organic material.

26. The optoelectronic circuit according to claim 25, wherein the transparent organic material is selected from the group consisting of polyimides, benzocyclobutene, polyfluorinatedcyclobutene, and aryl ether polymers containing perfluorocyclobutyl linkages.

27. The optoelectronic circuit according to claim 24, wherein the second material comprises a photoinagable organic material.

28. The optoelectronic circuit according to claim 27, wherein the photoimagable organic material is selected from the group consisting of polyimides, benzocyclobutene, polyfluorinatedcyclobutene, and aryl ether polymers containing perfluorocyclobutyl linkages.

29. The optoelectronic circuit according to claim 24, wherein the at least one optical element is integrally formed between first and second insulating layers.

30. The optoelectronic circuit according to claim 23, further comprising at least one electrical contact deposited within the first insulating layer.

31. The optoelectronic circuit according to claim 30, further comprising a first conductive layer deposited on the first flexible insulating layer and in electrical connectivity with the at least one electrical contact.

32. The optoelectronic circuit according to claim 31, further comprising a second conductive layer deposited on the second flexible insulating layer and in electrical connectivity with the first conductive layer.

33. The optoelectronic circuit according to claim 23, wherein the substrate comprises a material at least partially transparent to ultraviolet light.

34. The optoelectronic circuit according to claim 33, wherein the material at least partially transparent to ultraviolet light is selected from the group consisting of glass and quartz.

35. The optoelectronic circuit according to claim 33, wherein the release layer comprises an ultraviolet light sensitive adhesive layer formed on the substrate.

36. The optoelectronic circuit according to claim 23, wherein the substrate comprises a semiconductor material.

37. The optoelectronic circuit according to claim 36, wherein the release layer comprises an oxide layer formed on the semiconductor material.

38. A flexible optoelectronic circuit, comprising:
a first flexible insulating layer having a first refractive index;
at least one electrical contact deposited within the first insulating layer;
a first conductive layer deposited on the first insulating layer and in electrical connectivity with the at least one electrical contact;
a second flexible insulating layer having a second refractive index deposited on the first insulating layer, the second insulating layer having at least one optical element pattern defined therein;
at least one optical element deposited within the at least one optical pattern of the second insulating layer comprising a material having a third refractive; and
a third flexible insulating layer having a fourth refractive index deposited on the second insulating layer and the at least one optical element the third refractive index being higher than the first, second, and fourth refractive indices, wherein the optoelectronic circuit is independent of a substrate.

39. The flexible optoelectronic circuit according to claim 38, wherein the at least one optical element comprises a transparent organic material.

40. The flexible optoelectronic circuit according to claim 39, wherein the transparent organic material is selected from the group consisting of polyimides, benzocyclobutene, polyfluorinatedcyclobutene, and aryl ether polymers containing perfluorocyclobutyl linkages.

41. The flexible optoelectronic circuit according to claim 38, wherein the second insulating layer comprises a photoimagable organic material.

42. The flexible optoelectronic circuit according to claim 41, wherein the photoimagable organic material is selected from the group consisting of polyimides, benzocyclobutene, polyfluorinatedcyclobutene, and aryl ether polymers containing perfluorocyclobutyl linkages.

43. The flexible optoelectronic circuit according to claim 38, further comprising a second conductive layer deposited on the second flexible insulating layer and in electrical connectivity with the first conductive layer.

44. A method of forming a flexible optoelectronic circuit, comprising:
depositing a release layer on a substrate;
depositing a first flexible insulating layer on the substrate;
depositing a second flexible insulating layer on the first flexible insulating layer;
defining at least one optical element pattern in the second flexible layer;
depositing at least one optical element within the at least one optical element pattern;
depositing a third flexible insulating layer on the second flexible insulating layer and the at least one optical element; and
releasing the release layer from the first flexible insulating layer so as to remove the release layer and the substrate from the flexible optoelectronic circuit construct.

45. The method according to claim 44, wherein depositing a release layer comprises depositing an oxide layer on a semiconductor substrate.

46. The method according to claim 45, wherein depositing an oxide layer comprises growing an oxide layer on a semiconductor substrate.

47. The method according to claim 45, wherein releasing the release layer comprises etching the oxide layer.

48. The method according to claim 44, wherein depositing the second insulating layer comprises depositing a photoimagable organic material.

49. The method according to claim 48, wherein the defining at least one optical element pattern comprises imaging and etching an optical element pattern.

50. The method according to claim 48, wherein depositing a photoimagable organic material comprises depositing a photoimagable organic material selected from the group consisting of polyimides, benzocyclobutene, polyfluorinatedcyclobutene, and aryl ether polymers containing perfluorocyclobutyl linkages.

51. The method according to claim 44, wherein depositing a release layer comprises depositing an ultraviolet light sensitive adhesive on a material at least partially transparent to ultraviolet light.

52. The method according to claim 51, wherein releasing the release layer comprises exposing the ultraviolet light sensitive adhesive to ultraviolet light.

53. The method according to claim 44, further comprising depositing a conductive layer on at least one insulating layer.

54. The method according to claim 53, further comprising depositing electrical contacts within the first insulating layer, wherein the electrical contacts are in electrical connectivity with the conductive layer.

55. The method according to claim 44, wherein depositing the first, second, and third insulating layers comprises depositing via spin-on deposition.

56. A method of forming a flexible optoelectronic circuit, comprising:

depositing a release layer on a substrate;

depositing a first flexible insulating layer on the substrate;

depositing at least one optical element on a portion of the first flexible insulating layer;

depositing a second flexible insulating layer on the first flexible insulating layer and the at least one optical element; and releasing the release layer from the first flexible insulating layer so as to remove the release layer and the substrate from the flexible optoelectronic circuit construct.

57. The method according to claim 56, wherein depositing a release layer comprises depositing an oxide layer on a semiconductor substrate.

58. The method according to claim 57, wherein depositing an oxide layer comprises growing an oxide layer on a semiconductor substrate.

59. The method according to claim 57, wherein releasing the release layer comprises etching the oxide layer.

60. The method according to claim 56, wherein depositing a release layer comprises depositing an ultraviolet light sensitive adhesive on a material at least partially transparent to ultraviolet light.

61. The method according to claim 60, wherein releasing the release layer comprises exposing the ultraviolet light sensitive adhesive to ultraviolet light.

62. The method according to claim 56, wherein depositing the first and second insulating layers comprises depositing via spin-on deposition.

63. The method according to claim 56, wherein depositing the at least one optical element comprises depositing a photoimagable organic material, imaging the photoimagable material, and etching an optical element.

64. The method according to claim 63, wherein depositing a photoimagable organic material comprises depositing a photoimagable organic material selected from the group consisting of polyimides, benzocyclobutene, polyfluorinatedcyclobutene, and aryl ether polymers containing perfluorocyclobutyl linkages.

65. The method according to claim 56, further comprising depositing a conductive layer on at least one insulating layer.

66. The method according to claim 65, further comprising depositing electrical contacts within the first insulating layer, wherein the electrical contacts are in electrical connectivity with the conductive layer.

67. A flexible optoelectronic circuit formed by the process, comprising:

depositing a release layer on a substrate;

depositing a first flexible insulating layer on the substrate;

depositing at least one optical element on the first flexible insulating layer;

depositing a second flexible insulating layer on the first flexible insulating layer and the at least one optical element; and releasing the release layer from the first flexible insulating layer so as to remove the release layer and the substrate from the flexible optoelectronic circuit construct.

68. The flexible optoelectronic circuit according to claim 67, wherein depositing a release layer comprises depositing an oxide layer on a semiconductor substrate.

69. The flexible optoelectronic circuit according to claim 68, wherein depositing an oxide layer comprises growing an oxide layer on a semiconductor substrate.

70. The flexible optoelectronic circuit according to claim 68, wherein releasing the release layer comprises etching the oxide layer.

71. The flexible optoelectronic circuit according to claim 67, wherein depositing a release layer comprises depositing an ultraviolet light sensitive adhesive on a material at least partially transparent to ultraviolet light.

72. The flexible optoelectronic circuit according to claim 71, wherein releasing the release layer comprises exposing the ultraviolet light sensitive adhesive to ultraviolet light.

73. The flexible optoelectronic circuit according to claim 67, wherein depositing the first and second insulating layers comprises depositing via spin-on deposition.

74. The flexible optoelectronic circuit according to claim 67, wherein depositing the at least one optical element comprises depositing a photoimagable organic material, imaging the photoimagable material, and etching an optical element.

75. The flexible optoelectronic circuit according to claim 74, wherein depositing a photoimagable organic material comprises depositing a photoimagable organic material selected from the group consisting of polyimides, benzocyclobutene, polyfluorinatedcyclobutene, and aryl ether polymers containing perfluorocyclobutyl linkages.

76. The flexible optoelectronic circuit according to claim 67, the process further comprising depositing a conductive layer on at least one insulating layer.

77. The flexible optoelectronic circuit according to claim 76, the process further comprising depositing electrical contacts within the first insulating layer, wherein the electrical contacts are in electrical connectivity with the conductive layer.

* * * * *